(No Model.)
E. V. STRYKER.
FLY NET FOR HORSES.
No. 460,605. Patented Oct. 6, 1891.
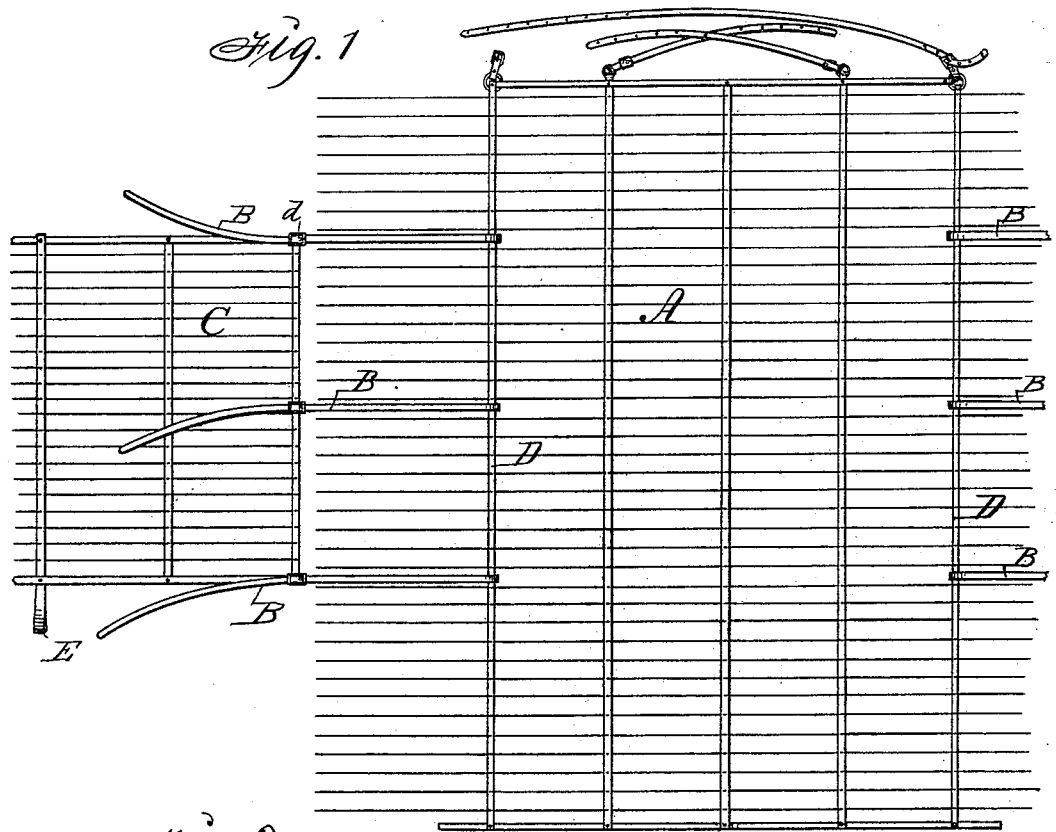
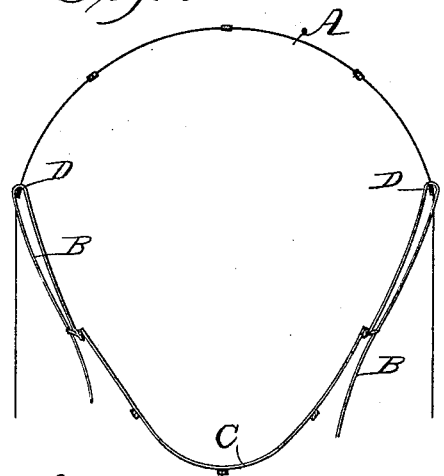
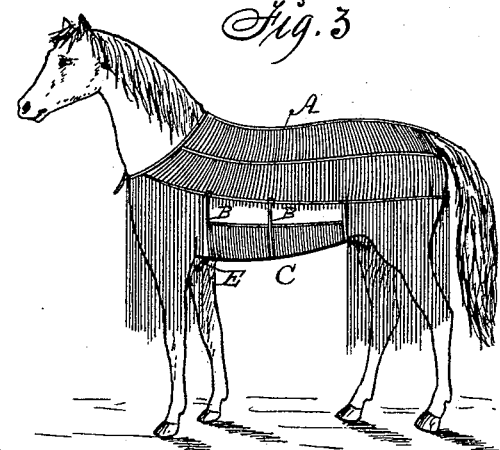
Witnesses:
R. H. Orwig
M. P. Smith
Inventor:
Elizabeth V. Stryker
By Thomas G. Orwig, Attorney

UNITED STATES PATENT OFFICE.

ELIZABETH V. STRYKER, OF PLAINFIELD, ILLINOIS.

FLY-NET FOR HORSES.

SPECIFICATION forming part of Letters Patent No. 460,605, dated October 6, 1891.

Application filed May 20, 1890. Serial No. 352,454. (No model.)

*To all whom it may concern:*

Be it known that I, ELIZABETH V. STRYKER, a citizen of the United States, residing at Plainfield, in the county of Will and State of Illinois, have invented a new and useful Attachment for a Fly-Net for Horses, of which the following is a specification.

My object is to provide a fly-net which shall practically cover all of a horse; and my invention consists, primarily, in the combination, with the usual form of net, of a supplemental net, so constructed as to pass around the under portion of the body, protecting the latter from the attacks of flies or other insects, and in certain details of construction hereinafter described, reference being had to the accompanying drawings, in which—

Figure 1 is a plan view of my improved fly-net, showing the means of construction between the main net and the attachment. Fig. 2 is a detail view showing the position of the net when in use. Fig. 3 shows the supplemental net attached to a net of common form that is placed on a horse in a common way, and to more fully disclose the position of the supplemental or auxiliary net on the under side of the body of the horse the depending straps or that portion of the main net that usually hangs below the body of the horse is removed.

A represents a net of common form, which extends over the back of the horse and downward over the sides in a common way.

B are straps attached to the straps D, that extend longitudinally along the edge of the net A.

C is an auxiliary net adapted to cover the under side of the body of a horse. The straps B are preferably fixed to the edges of the net C and adapted to be looped around the straps D of the net A, and their free ends then detachably fastened to the edges of the net C by means of buckles fixed to the net C or in any suitable way, so that the net C will be retained in proper position to cover and protect the under side of the body of a horse, as shown in Fig. 3.

My auxiliary net may be made of leather straps or any suitable flexible material, and permanently or detachably connected with one of the edges of a net adapted to extend over the back of a horse.

By this means it will be seen that the under side of the horse is well protected from insects, and, in connection with the top net, a more complete covering is provided.

I also provide a strap-loop E at the front and center of the attachment, through which the harness-girth may be passed to aid in securing the auxiliary net to the horse.

I am aware a blanket has had incisions in its edges to allow a part thereof to be turned inward to cover the under side of the body of a horse; but my attachment to a fly-net for covering the same portion of an animal is nevertheless novel and greatly advantageous for the purpose of protecting a horse from flies and at the same time allowing the circulation of air, as required to keep the body cool.

Having thus described my invention, what I claim as new therein, and desire to secure by Letters Patent of the United States, is—

As an improved article of manufacture, a fly-net composed of leather straps or other suitable material and adapted in shape to cover the under side of the body of a horse between the fore legs and hind legs and provided with cords, straps, or buckles or other suitable devices adapted for detachably connecting it with a fly-net of common form that is adapted to cover the back and sides of a horse.

ELIZABETH V. STRYKER.

Witnesses:
W. H. CHITTENDEN,
F. K. MACK.